US009200869B2

(12) United States Patent
Yang et al.

(10) Patent No.: US 9,200,869 B2
(45) Date of Patent: Dec. 1, 2015

(54) COMPOSITE OPTICAL DEVICE FOR SIGHTING TARGETS AND MEASURING DISTANCES

(75) Inventors: Dong Won Yang, Daejeon (KR); Dong Min Kwak, Daejeon (KR); Joo Hong Yoon, Daejeon (KR); Kyung Mok Kang, Daejeon (KR)

(73) Assignee: Agency for Defense Development, Jochiwongil, Yuseong-gu, Daejeon ( * ) Notice: Subject to any disclaimer, the term of this patent is extended or adjusted under 35 U.S.C. 154(b) by 894 days.

(21) Appl. No.: 13/264,357

(22) PCT Filed: May 18, 2010

(86) PCT No.: PCT/KR2010/003123
§ 371 (c)(1),
(2), (4) Date: Oct. 13, 2011

(87) PCT Pub. No.: WO2010/134738
PCT Pub. Date: Nov. 25, 2010

(65) Prior Publication Data
US 2012/0044475 A1   Feb. 23, 2012

(30) Foreign Application Priority Data
May 19, 2009   (KR) .................. 10-2009-0043613

(51) Int. Cl.
*G02B 23/00* (2006.01)
*F41G 1/35* (2006.01)
*G02B 27/01* (2006.01)
(Continued)

(52) U.S. Cl.
CPC .. *F41G 1/35* (2013.01); *F41G 1/38* (2013.01); *F41G 1/473* (2013.01); *G02B 23/105* (2013.01); *G02B 27/0189* (2013.01)

(58) Field of Classification Search
CPC ...... G02B 23/00; G02B 23/04; G02B 23/105; G02B 23/14; G02B 23/2407; G02B 23/2446; F41G 1/00; F41G 1/35; F41G 1/38; F41G 1/473
USPC ............ 359/350, 351, 353–357, 399; 42/111, 42/113, 114–117, 119, 122, 123, 130–131
See application file for complete search history.

(56) References Cited

U.S. PATENT DOCUMENTS 2,986,969 A * 6/1961 Muncheryan ................ 359/478
4,621,890 A * 11/1986 Suzuki et al. ................ 359/744
(Continued)

FOREIGN PATENT DOCUMENTS

KR   10-0900899 B1   6/2009

OTHER PUBLICATIONS

International Search Report for PCT/KR2010/003123.

*Primary Examiner* — Thong Nguyen
(74) *Attorney, Agent, or Firm* — Kenneth E. Horton; Kirton McConkie

(57) ABSTRACT

The present invention aims to provide a composite optical device which includes the day-time optical device, thermal imaging optical device, laser application device and displaying device while reducing the volume and weight, further comprising attenuator that can control the amount of light for easy display on the display. The present invention also aims to provide a composite optical device with enhanced efficiency of transmitting laser and easy operability by installing the attenuator at an appropriate location. To attain the object of the invention, the composite optical device for day and night time sighting and measuring distance, having a laser application device, a day-time optical device, a thermal imaging optical device and a display, comprises a laser transmitting optical device comprising a beam shaping lens 120 for shaping and sighting the laser emitted from a laser source 110, a focus lens 130 installed in front of the beam shaping lens 120 for controlling the emitting angle of the laser, and a folding mirror 140 installed in front of the focus lens 130 for reflecting the laser passed through the beam shaping lens 120 and focus lens 130 to a first beam splitter 270, a day-time optical device installed between a objective unit 290 and a eye-piece 210, the eye-piece and objective unit being arranged seeing each other, comprising a objective lens 280 for transmitting the light reflected from the first beam splitter, a first beam splitter 270, a first attenuator 260, a second beam splitter 250, relay unit 240, eye-piece lens 230, and a second attenuator 220, which are located between the first beam splitter and the eye-piece 210 in the order described above, and a display 300 installed on one side of the second beam splitter 250 to transmit a specific image to the second beam splitter 250.

2 Claims, 3 Drawing Sheets

(51) Int. Cl.
  *F41G 1/38* (2006.01)
  *F41G 1/473* (2006.01)
  *G02B 23/10* (2006.01)

(56) References Cited

U.S. PATENT DOCUMENTS

| | | | |
|---|---|---|---|
| 5,084,780 A * | 1/1992 | Phillips | 359/350 |
| 5,495,676 A * | 3/1996 | Chesnut et al. | 42/129 |
| 5,905,592 A * | 5/1999 | Gohdo et al. | 359/424 |
| 5,973,315 A * | 10/1999 | Saldana et al. | 250/214 VT |
| 6,204,961 B1 * | 3/2001 | Anderson et al. | 359/353 |
| 6,583,862 B1 * | 6/2003 | Perger | 356/4.01 |
| 7,293,992 B2 | 11/2007 | Fredrinksson | |
| 2002/0021511 A1 * | 2/2002 | Lee et al. | 359/888 |

* cited by examiner

Fig. 2
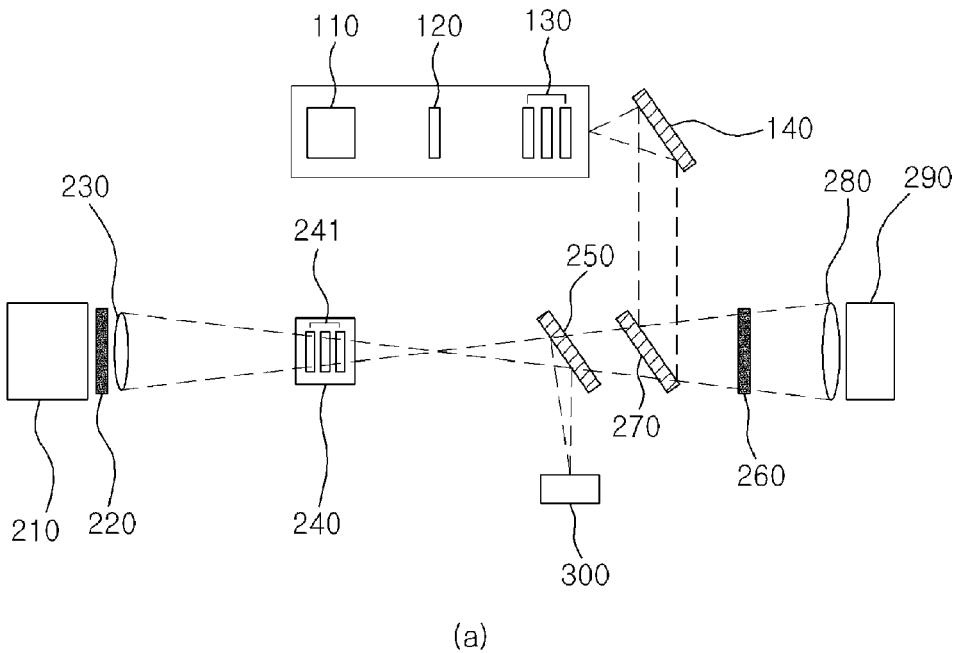
(a)
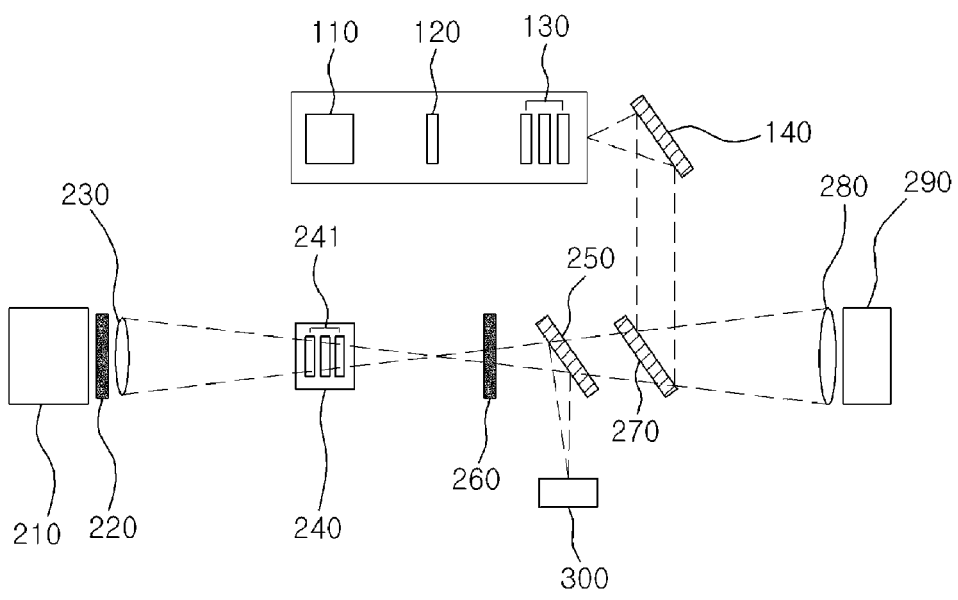
(b)

COMPOSITE OPTICAL DEVICE FOR SIGHTING TARGETS AND MEASURING DISTANCES

TECHNICAL FIELD

The present invention relates to a composite optical device for use in fire control devices or sighting device, and more particularly, to a composite optical device for sighting targets at day and night time, and measuring distances, which is developed for applying to military equipments such as fire control devices or sighting device, or special optical devices, wherein the day-time optical device, thermal imaging optical device, laser application device and displaying device are optimized in one system, thereby reducing the volume and weight, enhancing contrast of display and making it easy to control the light controller.

BACKGROUND ART

Firing control devices and day-time/night-time sighting optical devices attached to rifles, machine guns or crew-served weapons generally use one or more of day-time optical devices, thermal imaging optical devices and laser optical devices for detecting objects. For the maximum performance of detecting objects, however, there has been need for a composite optical device incorporating the laser optical device as well as the day-time optical device and thermal-imaging optical device. Also it has been needed a separate displaying device for displaying the state of the devices, texts and sighting point.

Although some devices have included all these functions in them, the devices had the problem of being large in size and heavy in weight, making it difficult for a user to carry and use the device.

Also, it is hard to recognize texts or images displayed on the display panel when the optical device is used at day time or when the display is illuminated by bright light such as sun light, vehicle head lamp or illuminating shell. Therefore, most conventional optical devices use an aperture for controlling the amount of incoming light. However, it is difficult to control the amount of lights to a uniform distribution using an aperture, and there is much difficulty in controlling various optical devices inside a composite optical device incorporating them from outside. Also, conventional devices are not appropriate for use in military equipments or in special devices which should be operated under conditions of various temperatures (especially bad operability at low temperature) or physical impacts. Although some polarizer is used to control the amount of light in military devices, they have been used in each optical device (day-time or thermal-imaging optical device and laser device) respectively and appropriate structure for a composite optical device still needs to be invented.

SUMMARY

This application describes a composite optical device which includes a day-time optical device, a thermal imaging optical device, a laser application device and a display while reducing volume and weight, further comprising an attenuator that can control the amount of light for easy display on the display. Such a configuration provides the composite optical device with enhanced efficiency of transmitting laser and easy operability by installing the attenuator at an appropriate location. The composite optical device for day and night time sighting and measuring distance has the laser application device, the day-time optical device, the thermal imaging optical device and the display, and comprises a laser transmitting optical device comprising a beam shaping lens for shaping and sighting a laser emitted from a laser source, a focus lens installed in front of the beam shaping lens for controlling a emitting angle of the laser, and a folding mirror installed in front of the focus lens for reflecting the laser passed through the beam shaping lens and the focus lens to a first beam splitter, the day-time optical device installed between an objective unit and an eye-piece, the eye-piece and the objective unit being arranged seeing each other, comprising an objective lens for transmitting a light reflected from the first beam splitter, the first beam splitter, a first attenuator, a second beam splitter, a relay unit, a eye-piece lens, and a second attenuator, which are located between the first beam splitter and the eye-piece in the order described above, and the display installed on one side of the second beam splitter to transmit a specific image to the second beam splitter.

DISCLOSURE OF INVENTION

Technical Problem

The present invention has been designed to solve the problem of prior arts and meet the needs of the industry, and aims to provide a composite optical device which includes the day-time optical device, thermal imaging optical device, laser application device and displaying device while reducing the volume and weight, further comprising attenuator that can control the amount of light for easy display on the display. The present invention also aims to provide a composite optical device with enhanced efficiency of transmitting laser and easy operability by installing the attenuator at an appropriate location.

Solution to Problem

To obtain the object of the present invention, the composite optical device for day and night time sighting and measuring distance, having a laser application device, a day-time optical device, a thermal imaging optical device and a display, comprises a laser transmitting optical device comprising a beam shaping lens 120 for shaping and sighting the laser emitted from a laser source 110, a focus lens 130 installed in front of the beam shaping lens 120 for controlling the emitting angle of the laser, and a folding mirror 140 installed in front of the focus lens 130 for reflecting the laser passed through the beam shaping lens 120 and focus lens 130 to a first beam splitter 270, a day-time optical device installed between a objective unit 290 and a eye-piece 210, the eye-piece and objective unit being arranged seeing each other, comprising a objective lens 280 for transmitting the light reflected from the first beam splitter, a first beam splitter 270, a first attenuator 260, a second beam splitter 250, relay unit 240, eye-piece lens 230, and a second attenuator 220, which are located between the first beam splitter and the eye-piece 210 in the order described above, and a display 300 installed on one side of the second beam splitter 250 to transmit a specific image to the second beam splitter 250, the second beam splitter 250 reflecting the specific image transmitted from the display 300 to be superposed on the eye-piece lens.

Also, in the composite optical device for day and night time sighting and measuring distance, the first beam splitter 270, objective lens 280 and objective unit 290 are shared by the laser transmitting device and the day-time optical device.

Advantageous Effects of Invention

According to the composite optical device for day and night time sighting and measuring distance of the present invention, a day-time optical device, a thermal imaging optical device and a laser transmitting optical device are formed in one body, providing the effect of maximizing the performance for detecting objects. Also, the efficiency of transmitting laser can be enhanced by installing one of the two polarizers(attenuator) on the eye-piece and the other between the first beam splitter and the second beam splitter, enabling shared use of the beam splitter objective lens objective unit of the laser transmitting optical device and the day-time optical device so that the volume and weight of the device is reduced, contrast of the display increased and the operation of the polarizer made easier.

Further, the performance for detecting view images can be maximized by easily integrating the images incoming from the separate module through the adjusting structure of the display and the day-time image, thereby making it possible to apply the device to other devices such as detecting targets under special environments.

BRIEF DESCRIPTION OF DRAWINGS

FIG. 2(a) shows the optical device of the present invention with the first attenuator being installed between the first beam splitter and the objective lens.

FIG. 2(b) shows the optical device of the present invention with the first attenuator being installed between the second beam splitter and the relay unit.

DESCRIPTION ON THE NUMERALS IN THE DRAWINGS

Figure 1:
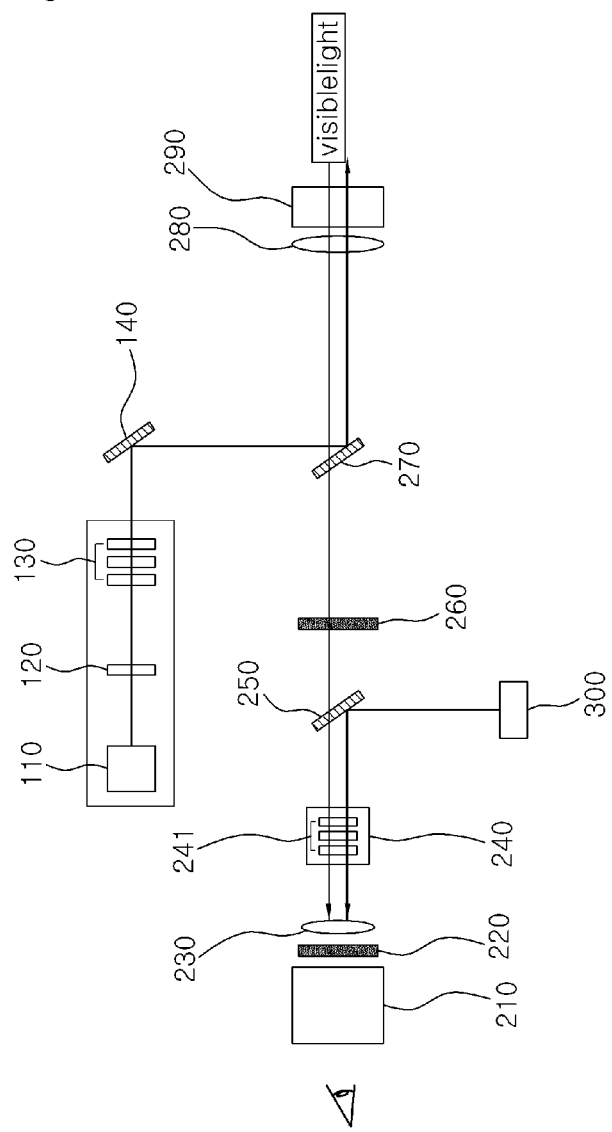
FIG. 1 is an exploded perspective view of the present invention.

110: laser source 120: beam shaping lens
130: focus lens 140: folding mirror 210: eye-piece
220: second attenuator (polarizer) 230: eye-piece lens 240: relay unit
241: relay lens 250: second beam splitter 260: first attenuator (polarizer)
270: first beam splitter 280: objective lens 290: objective unit 300: display

BEST MODE FOR CARRYING OUT THE INVENTION

A preferable example of the present invention will be described in detail with reference to the drawings attached.

Figure 3:
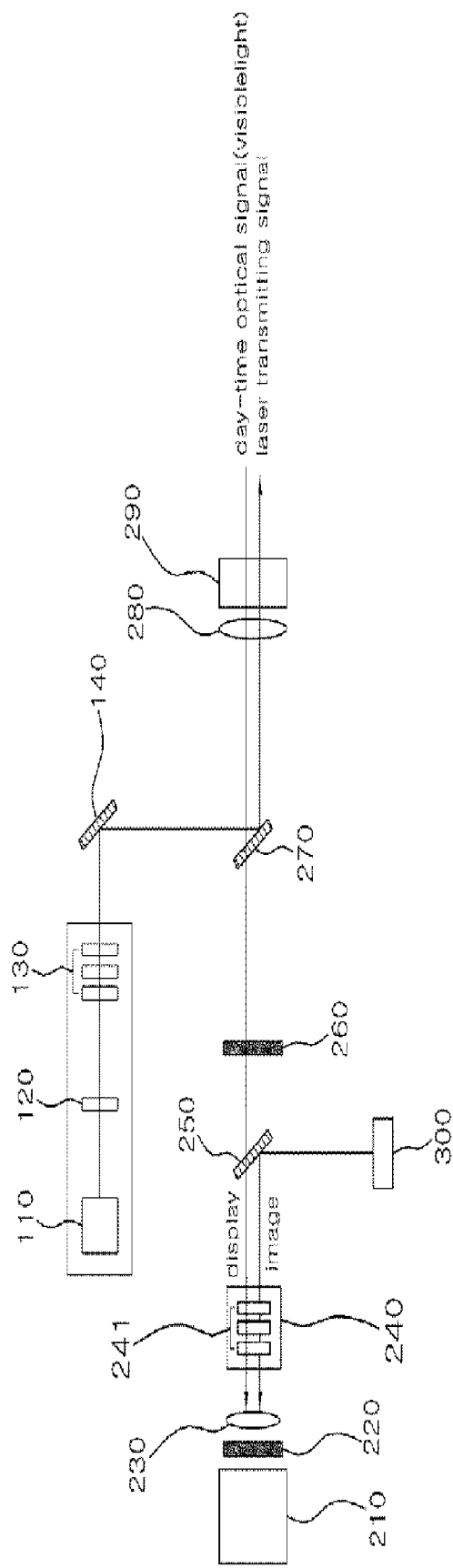
FIG. 3 shows the path of light in the optical device of the present invention.

FIG. 1 is an exploded perspective view of the present invention, FIG. 2(a) shows the optical device of the present invention with the first attenuator being installed between the first beam splitter and the objective lens, FIG. 2(b) shows the optical device of the present invention with the first attenuator being installed between the second beam splitter and the relay unit, and FIG. 3 shows the path of light in the optical device of the present invention.

The composite optical device of the present invention comprises a laser transmitting optical device (a laser application device), a day-time optical device, display and a thermal imaging optical device.

The laser transmitting optical device comprises a laser source 110, a beam shaping lens 120 for shaping and sighting the laser emitted from a laser source 110, a focus lens 130 installed in front of the beam shaping lens 120 for controlling the emitting angle of the laser, and a folding mirror 140 installed in front of the focus lens 130 for reflecting the laser passed through the beam shaping lens 120 and focus lens 130 to a first beam splitter 270.

As shown in FIG. 1, the laser received by the laser source 110 passes through the beam shaping lens 120 and focus lens 130 in the order described above, and reached the first beam splitter 270 by the folding mirror 140, and reflected again by the first beam splitter 270 and passes through the objective lens 280 and objective unit 290. The laser transmitting optical device is equipped with a beam splitter, objective lens and objective unit when used independently. In the present invention, however, the beam splitter, objective lens and objective unit of the laser transmitting optical device are shared with the first beam splitter 270, objective lens 280 and objective unit 290.

Said laser transmitting optical device has the structure by which the control of the emitting angle and laser focus is possible simultaneously, making it easy to arrange the equipment and control focus.

Also, the day-time optical device is installed between an objective-piece unit 290 and an eye-piece 210, the eye-piece and objective unit being arranged seeing each other, comprising a objective lens 280 for transmitting the light reflected from the first beam splitter, a first beam splitter 270, a first attenuator 260, a second beam splitter 250, relay unit 240, eye-piece lens 230, and a second attenuator 220, which are located between the first beam splitter and the eye-piece 210 in the order described above On the image surface of the eye-piece lens 230 is formed a second image surface through the relay lens 241 installed on the relay unit 240, and the image of the display 300 is superposed by the second beam splitter 250. Further, optical mesh lines are formed on the image surface of the objective lens 280 providing display standard of the laser transmitting optical device and thermal image display.

Also, two attenuators (the first and the second attenuators) are formed in order to control the contrast between the intensity of the display 300 and the intensity of the external image.

The first and the second attenuators 260, 230, which comprise a polarizer, compensates the intensity difference between the external image and the display 300, and control the amount of light presenting the possibility of enhancing or reducing the recognition facility of the OLED character shown on the eye-piece 210. However, when the first attenuator 260 is installed between the first beam splitter 260 and the objective lens 280 as shown in FIG. 2(a), the amount of light can be controlled from outside through the first beam splitter 260, but there is a problem of reduced transmission efficiency of the laser emitting from the laser transmitting optical device. Also, when the first attenuator 260 is installed between the second beam splitter 250 and the relay unit 240 as shown in FIG. 2(b), it is difficult to form a contrast ratio between the display 300 and the day-time optical device since the intensity of the display 300 image and the day-time optics is controlled simultaneously.

Therefore, in order to control the intensity of the day-time images without affecting the laser transmitting optical device, the first attenuator 260 is installed between the first beam splitter 270 and the second beam splitter 250, and the second attenuator 250 is installed between the eye-piece 210 and the eye-piece lens 230 so that a user can control the amount of light from outside.

Also, the first beam splitter 270 is installed between the first attenuator 260 and the objective lens 280, reflecting the laser reflected from the folding mirror 140 of the laser transmitting optical device to the objective unit 290, and the second beam splitter 250 is installed between the relay unit 240 and first attenuator 260, reflecting the laser reflected from the display 300 to the eye-piece 210.

Further, the display 300 transmits a specific image to the second beam splitter 250, reflects the specific image to the eye-piece lens 230 through the second beam splitter 250, and then makes the image formed on the eye-piece lens 230 and the specific image superposed.

Then, the path of the light of the composite optical device of the present invention will be described with reference to FIG. 3.

The laser received from the laser source 110 passes through the beam shaping lens 120 and the focus lens 130, reflected to the first beam splitter 270 by the folding mirror 140, and then reflected to the objective unit 290 through the first beam splitter 270. Also the specific image received by the second beam splitter 250 from the display 300 is reflected by the second beam splitter 250, passes through the relay unit 240, and reaches the eye-piece lens 230. Also, the day-time optical signal (visible light) passes the objective unit 290, objective lens 280, the first beam splitter 260 and relay unit 240, and reaches the eye-piece lens 230. Therefore, the specific image received by the eye-piece lens 230 from the display 300 is displayed superposed with the external day-time optical signal, thereby enhancing the object detecting performance of the device.

The present invention has been described in detail with reference to a preferable example. The invention, however, is not limited by the example, and it is obvious that the example can be variously modified by those skilled in the art within the scope of the present invention. Accordingly, the scope of the invention should be interpreted by the claims attached, and all technical ideas which are equivalent to the present invention should be regarded as belonging to the scope of the present invention.

The invention claimed is:

1. A composite optical device for day and night time sighting and measuring distance, having a laser application device, a day-time optical device, a thermal imaging optical device and a display, which comprises:

the day-time optical device installed between an objective unit and an eye-piece, the eye-piece and the objective unit being arranged seeing each other, the day-time optical device comprising an objective lens, a first beam splitter, a first attenuator, a second beam splitter, a relay unit, an eye-piece lens, and a second attenuator sequentially installed between the objective unit and the eye-piece so as to control an amount of light from outside the composite optical device;

the laser application device comprising a beam shaping lens for shaping and sighting a laser emitted from a laser source, a focus lens installed in front of the beam shaping lens for controlling an emitting angle of the laser, and a folding minor installed in front of the focus lens for reflecting the laser passed through the beam shaping lens and the focus lens to the first beam splitter; and the display installed on one side of the second beam splitter to transmit a specific image to the second beam splitter, the second beam splitter reflecting the specific image transmitted from the display to be superposed on the eye-piece lens.

2. The composite optical device for day and night time sighting and measuring distance of claim 1, wherein the first beam splitter, the objective lens and the objective unit are shared by the laser application device and the day-time optical device.

\* \* \* \* \*